United States Patent [19]
Börner

[11] 3,746,436
[45] July 17, 1973

[54] MOTION PICTURE CAMERA WITH FADING MEANS

[75] Inventor: Gerhard Börner, Musberg, Germany

[73] Assignee: Robert Bosch Photokino GmbH, Stuttgart, Germany

[22] Filed: Mar. 7, 1972

[21] Appl. No.: 232,464

[30] Foreign Application Priority Data
Mar. 19, 1971 Germany.................. P 21 13 272.9

[52] U.S. Cl..................................... 352/91, 352/217
[51] Int. Cl. .............................................. G03b 21/36
[58] Field of Search............................... 352/91, 217

[56] References Cited
UNITED STATES PATENTS

| | | | |
|---|---|---|---|
| 3,545,852 | 12/1970 | Winkler et al.......................... | 352/91 |
| 3,644,025 | 2/1972 | Katsuyama............................ | 352/91 |
| 3,617,118 | 11/1971 | Muller.................................... | 352/91 |

*Primary Examiner*—Samuel S. Matthews
*Assistant Examiner*—Russell E. Adams, Jr.
*Attorney*—Michael S. Striker

[57] ABSTRACT

A motion picture camera wherein an axially movable gear which drives the adjusting mechanism for the diaphragm during the making of exposures with fade-out effect is coupled to the camera motor or to a separate motor in response to depression of a button which automatically prepares a switch-actuating member to reverse the camera motor so as to begin with the rearward transport of that portion of the film which was exposed with fade-out effect simultaneously with completion of fade-out exposures. The making of exposures with fade-out effect is terminated automatically because the gear is disengaged from the associated motor in response to exposure of a predetermined number of film frames. The renewed exposure of such film portion, but with fade-in effect, is started in response to depression of the camera release element which causes an entraining member to return the gear into torque-receiving engagement with the associated motor. A control ring on the camera housing can be manipulated by hand to make exposures with fade-out or fade-in effect. The fading mechanism further employs a selector which can be moved to either of two positions in one of which the rearward transport of the film portion which was exposed with fade-out effect begins automatically in response to completion of a predetermined number of fade-out exposures and in the other of which no rearward transport of film takes place so that the exposures with fade-in effect follow the exposures with fade-out effect.

40 Claims, 13 Drawing Figures

MOTION PICTURE CAMERA WITH FADING MEANS

BACKGROUND OF THE INVENTION

The present invention relates to motion picture cameras in general, and more particularly to improvements in motion picture cameras which are provided with fading mechanisms, especially with fading mechanisms of the type enabling the camera to make exposures with fade-out effect, to then transport rearwardly that portion of the film which was exposed with fade-out effect, and to thereupon expose the once-exposed film portion for the second time but with fade-in effect.

It is already known to provide a motion picture camera with a manually and/or motor-operated fading mechanism. It is also known to provide a camera with a fading mechanism which enables the user to expose a certain number of frames first with fade-out effect and thereupon with fade-in effect so that the last part of the preceding scene appears to merge into the first part of the next-following scene; to merely make a series of exposures with fade-out effect; to merely make a series of exposures with fade-in effect; or to make a series of exposures with fade-in effect on a first film portion followed by a series of exposures with fade-out effect on a second film portion or vice versa.

A drawback of manually operated fading mechanisms is that the number of frames which are exposed with fade-out effect seldom matches the number of frames which are exposed with fade-in effect. Such identity of the two numbers of frames is important when the exposures with fade-in effect are to be superimposed upon exposures with fade-out effect because it is then desirable that each frame of a given number of successive frames be exposed twice, first with fade-out and thereupon with fade-in. Attempts to provide a camera having a manually operated fading mechanism with specially constructed control devices which should insure that the number of film frames which were exposed with fade-out effect equals the number of film frames to be exposed with fade-in effect have met with little success because the control devices are quite complicated, bulky and prone to malfunction. Moreover, such types of fading mechanisms cannot be properly operated by beginners or relatively inexperienced amateur photographers.

Certain recent types of fading mechanisms for use in motion picture cameras are designed to motorize certain phases of a complete fading operation, i.e., to motorize the making of exposures with fade-out effect, the rearward transport of the film portion which was exposed with fade-out effect, or the making of exposures with fade-in effect subsequent to completion of rearward transport of the once-exposed film portion. In such types of cameras, each stage of the fading operation must be initiated by hand regardless of whether the phase which is about to begin is performed motorically or manually. It is further known to provide a motion picture camera with a fully motorized fading mechanism (see German patent No. 679,318) or with a fading mechanism wherein at least two of the three stages are completed in automatic response to generation of a starting signal. A drawback of all such partially or fully motorized fading mechanisms is that they contribute excessively to the cost, bulk and complicatedness of the camera. Furthermore, even the most sophisticated motorized fading mechanisms which are presently used in motion picture cameras necessitate that the operator of the camera decide, prior to start of a fading operation, whether the exposures with fade-in effect are to precede the exposures with fade-out effect (or vice versa) or whether the exposures with fade-in effect are to be superimposed upon the exposures with fade-out effect. This is often undesirable since the user does not know in advance whether or not the nature of exposures which are to be made will be such that the exposures with fade-in effect (at the start of a fresh series of pictures) should or should not be superimposed upon the exposures with fade-out effect (i.e., upon the last series of shots of a preceding scene). An exception is a fading mechanism wherein the making of exposures with fade-out and fade-in effect is carried out by hand but the film can be automatically transported rearwardly upon completion of fade-out exposures and prior to the making of exposures with fade-in effect. In this last mentioned semiautomatic fading mechanism, the decision whether or not to have the exposures with fade-in effect follow or overlap the exposures with fade-out effect can be made after the start of exposures with fade-out effect provided that the operator continues to press the release element of the camera. The fading mechanism emloys a selector which must be set for the making of exposures with fade-out effect and fade-in effect one after the other or for double exposure of a series of film frames, first with fade-out effect and thereupon with fade-in effect. The selector can be moved between its two positions to change the setting of the fading mechanism either before the start of the making of exposures with fade-out effect or during the making of such exposures provided that the release element remains in operative position. Reference may be had to U.S. Pat. No. 3,606,529. The versatility of the just described semiautomatic fading mechanisms is unsatisfactory because it happens again and again that the decision to merge the first exposures of a fresh scene into the last exposures of a preceding scene must or can be made only after the making of exposures with fade-out effect is completed. The same holds true if the operator has decided to merge the first exposures of a fresh scene into the last exposures of a preceding scene and thereupon discovers that such mode of picture taking is unsatisfactory or undesirable.

SUMMARY OF THE INVENTION

An object of the present invention is to provide a motion picture camera with a novel and improved fading mechanism whose versatility greatly exceeds the versatility of known fading mechanisms and which is at least as compact, as rugged, as reliable and as easy to operate as presently known fading mechanisms.

Another object of the invention is to provide a fading mechanism wherein each and every stage of a fading operation can be motorized regardless of whether the exposures with fade-in effect are to follow or are to be superimposed upon the exposures with fade-out effect.

A further object of the invention is to provide a fading mechanism wherein the film portion which was exposed with fade-out effect is automatically transported in a rearward direction as soon as the making of exposures with fade-out effect is completed if the fade-in exposures are to be superimposed upon the fade-out exposures.

An additional object of the invention is to provide a fading mechanism which is constructed and assembled in such a way that the camera release element need not be held in its operative position during one or more stages of a complete fading operation.

Still another object of the invention is to provide a fading mechanism whose construction and mode of operation are such that the user can decide to have the exposures with fade-in effect follow or overlap the exposures with fade-out effect as late as immediately prior to the making of exposures with fade-in effect.

A further object of the invention is to provide the fading mechanism with novel and improved control means for regulating the various stages of a fading operation.

The invention resides in the provision of a motion picture camera wherein the fading means comprises a diaphragm which is adjustable to provide a light-admitting aperture whose size decreases during the making of first exposures with fade-out effect and increases during the making of second exposures with fade-in effect, adjusting means which is operable to adjust the diaphragm during the making of first or second exposures, drive means for transporting the film past the light-admitting aperture forwardly and rearwardly, and novel control means for establishing and terminating an operative connection between the drive means and the adjusting means for the making of first and second exposures and for initiating a rearward transport of the film portion which was exposed to scene light during the making of first exposures prior to the making of second exposures. The control means comprises a preferably rotary and axially movable first control member which is arranged to receive motion from the drive means during the making of first and second exposures (and can operate the adjusting means for the diaphragm while receiving motion from the drive means), and a preferably rotatable and axially movable second control member which is preferably designed to actuate various electric switches or analogous signal generating devices and is arranged to receive motion from the drive means during the making of second exposures as well as when the camera makes exposures without fade-out or fade-in effect. The second control member can automatically reverse the drive means to effect a rearward transport of the once-exposed film portion (with fade-out effect) simultaneously with disengagement of the first control member from the drive means upon completion of exposures with fade-out effect.

The novel features which are considered as characteristic of the invention are set forth in particular in the appended claims. The improved fading mechanism itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
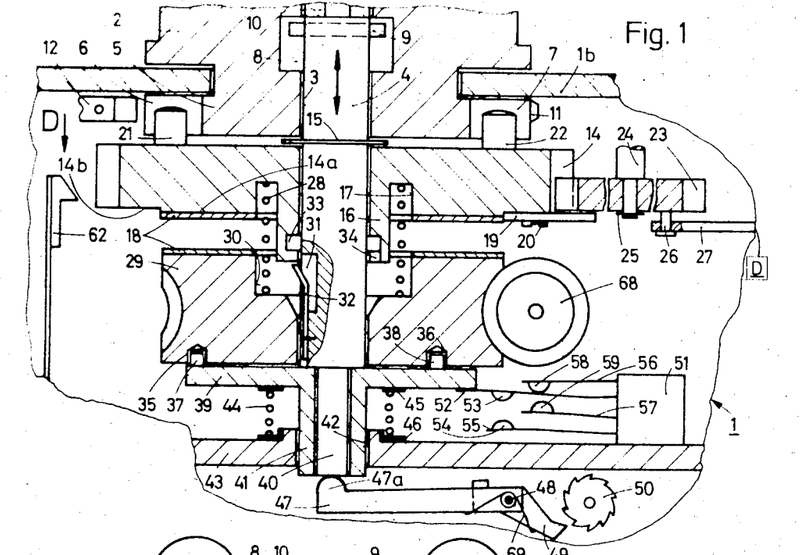
FIG. 1 is a fragmentary sectional view of a motion picture camera which embodies the improved fading mechanism, the first and second control members of the fading mechanism being shown in positions they assume when the camera is ready to make normal exposures without fade-out or fade-in effect.
Figure 12:
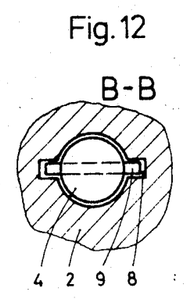
FIG. 12 is a horizontal sectional view as seen in the direction of arrows from the line B—B of FIG. 3.
Figure 13:
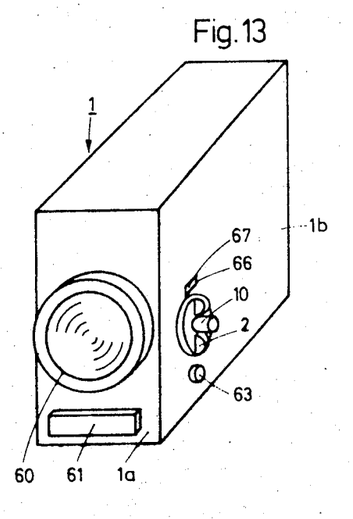
FIG. 13 is a perspective view of the motion picture camera which embodies the structure shown in FIGS. 1 to 12.

Referring first to FIGS. 1 and 13, there is shown a motion picture camera having a housing or body 1 the front wall 1a of which supports a lens mount 60 and one side wall 1b of which is provided with an opening for the median portion of a rotary control ring 2. As shown in FIG. 1, the control ring 2 is held by the side wall 1b against axial movement and is provided with an axial bore 3 for a reciprocable displacing shaft 4 the upper end portion of which is provided with or attached to a handgrip member here shown as a button 10 (see also FIG. 2). The axial bore 3 of the control ring 2 communicates with the halves of a diametrically extending internal groove 8 (see also FIG. 12) which receives the exposed ends of a pin 9. The pin 9 is mounted in the shaft 4 and causes the shaft to rotate with the control ring 2 when the latter is turned by hand. The length of the groove 8 (as considered in the axial direction of the control ring 2) determines the extent to which the displacing shaft 4 can be depressed by way of the button 10.

Figure 6:
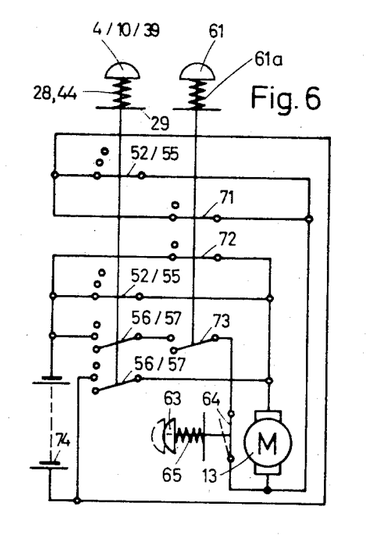
FIG. 6 is a diagram of the electric circuit of the camera showing the displacing means for the first and second control members and the camera release element in positions they assume when the camera motor transports motion picture film forwardly.
Figure 7:
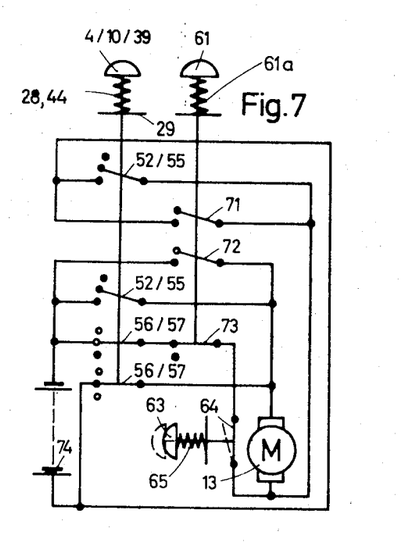
FIG. 7 illustrates the diagram of FIG. 6 but with the various switches in positions they assume when the camera motor is operated in reverse.
Figure 8:
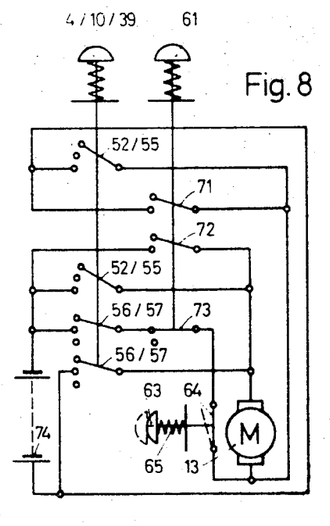
FIG. 8 shows the diagram of FIGS. 6 or 7 but with the switches in positions they assume when the camera motor is idle.
Figure 9:
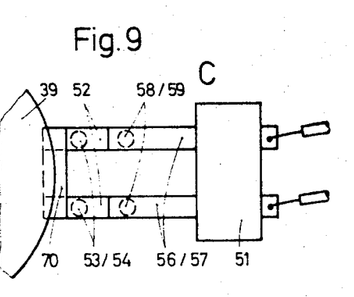
FIG. 9 is an enlarged plan view of a switch assembly in the circuit of FIGS. 6–8.

That portion of the control ring 2 which is inwardly adjacent to the side wall 1b forms a female coupling element or collar 5 which is provided with two recesses or sockets 6, 7 located diametrically opposite each other with reference to the axis of the bore 3. The collar 5 is further provided with an actuating portion or trip 11 which can actuate an electric switch 12 in response to rotation of the control ring 2 through 180° from the angular position shown in FIG. 1. The switch 12 is mounted at the inner side of the side wall 1b and is connected in the circuit of the camera motor 13 which is shown in FIGS. 6 to 8.

The displacing shaft 4 rotatably supports a control member here shown as a gear 14 which is inwardly adjacent to the collar 5 of the control ring 2. The parts 5 and 14 are separated from each other by a washer 15 which is fixed to the shaft 4 and can move the gear 14 away from the collar 5 in response to depression of the button 10 (compare FIGS. 1 and 2). The inner end face 14a of the gear 14 (namely, that end face which faces away from the collar 5) is provided with an annular groove 17 which surrounds a downwardly extending annular hub 16. A ring-shaped friction pad 18 surrounds the groove 17 and is fixedly secured to the inner end face 14a of the gear 14. The pad 18 does not extend all the way to the annulus of teeth on the periphery of the gear 14 because the end face 14a is provided with a shoulder surrounded by an annular depression 14b a portion of which receives an arcuate segment 19 affixed to the gear 14 by means of screws or analogous fasteners 20 and extending radially beyond the teeth of the gear 14. The center of curvature of the segment 19 is located on the axis of the shaft 4 and this segment extends along an arc of approximately 180°.

The other or outer end face of the gear 14 is provided with two male coupling elements in the form of projections or studs 21, 22 which normally extend into the sockets 6, 7 of the collar 5 (see FIG. 1). When the button 10 is depressed to assume the position shown in FIG. 2, the projections 21, 22a are respectively expelled from the sockets 6, 7 so that the gear 14 can be rotated by the camera motor 13 independently of the control ring 2.

The teeth of the gear 14 mesh with the teeth of gear 23 which is rotatably mounted in the housing 1 on a fixed shaft 24 and is held against axial movement by a washer 25. The gear 23 is provided with an eccentric pin 26 for one end of a diaphragm setting member 27. The latter causes the diaphragm D to reduce the size of its light-admitting aperture when the gear 14 is rotated from the angular position shown in FIGS. 1 or 2, i.e., when the eccentric pin 26 is caused to move to the left, as viewed in FIGS. 1 or 2. The setting member 27 causes the diaphragm D to increase the size of its light-admitting aperture when the pin 26 moves back toward the position shown in FIGS. 1 or 2. The parts 23-27 constitute an adjusting means which can change the size of the light-admitting aperture furnished by the diaphragm D during the making of exposures with fade-out or fade-in effect. The diameter of the gear 23 equals that of the gear 14.

A helical spring 28 which extends into the annular groove 17 in the inner end face 14a of the gear 14 further extends into an annular groove 30 in the adjacent end face of a worm wheel 29 which is rotable on the displacing shaft 4. The worm wheel 29 is held against axial movement and can be rotated by a worm 68 which derives motion from the camera motor 13. That end face of the worm wheel 29 which is provided with the groove 30 is bonded to a friction pad 18 which surrounds the groove 30 and can engage the friction pad 18 on the end face 14a to thereby rotate the gear 14 when the button 10 is depressed to assume the position shown in FIG. 2. The spring 28 serves as a means for biasing the gear 14 away from engagement with the worm wheel 29 and toward engagement with control ring 2.

That portion of the displacing shaft 4 which is surrounded by the worm wheel 29 (in undepressed position of the button 10) is provided with an axially parallel peripheral groove 31 for a detent leaf spring 32 the upper portion of which constitutes a tongue or pallet and can be received in an internal annular groove 33 of the hub 16. An axially parallel slot 34 extends between the groove 33 and the lower end face of the hub 16 and is just wide enough to permit the pallet of the spring 32 to move therein into or out of the groove 33 in a certain angular position of the gear 14 (see FIGS. 3–5). The purpose of the spring 32 is to oppose the axial movement of the displacing shaft 4 toward the position of FIG. 1 (i.e., upwardly, as viewed in FIG. 2 and away from the position shown in FIG. 2) save in that angular position of the gear 14 in which the slot 34 of its hub 16 registers with the pallet of the spring 32. On the other hand, the pallet of the spring 32 cannot offer effective resistance to movement of the gear 14 back to the axial position of FIG. 1 under the action of the spring 28 because the pallet can be depressed into the groove 31 in response to expansion of the spring 28 as soon as the projections 21, 22 register with the sockets 6, 7 or 7, 6. The pallet of the spring 32 will register with the slot 34 so that the pallet will be free to enter the groove 33 of the hub 16 upon completed making of the exposures with fade-out effect, namely, upon completed rotation of the gear 14 through 180° from the angular position shown in FIGS. 1 or 2 to that shown in FIGS. 3–5.

The lower end face of the worm wheel 29 (as viewed in FIGS. 1 to 5) is provided with two recesses or sockets 35, 36 which may be located diametrically opposite each other with reference to the axis of the displacing shaft 4 and can receive coupling elements in the form of projections or studs 37, 38 provided at the upper side of a control member here shown as a switch-actuating plate 39. The sockets 35, 36 are located at different distances from the axis of the displacing shaft 4 so that, when the worm wheel 29 leaves the angular position shown in FIGS. 1 or 2, it must complete a full revolution before the projections 37, 38 can respectively reenter the sockets 35, 36 or the worm wheel 29 must rotate rearwardly back to the angular position of FIG. 1. The control member or plate 39 is rotatable on a smaller-diameter inner end portion or stub 40 of the displacing shaft 4 and has an inwardly extending cylindrical hub 41 which is received in a bore 42 provided therefor in an internal wall or partition 43 of the camera housing 1. A helical braking spring 44 which is interposed between the partition 43 and plate 39 biases the latter toward the worm wheel 29 so that the plate 39 automatically returns from the axial position of FIG. 2 to the axial position of FIG. 1 when it is permitted to perform such movement by the pallet of the spring 32 and when the projections 37, 38 respectively register with the sockets 35, 36. The end convolutions of the braking spring 44 bear against friction generating braking washers or pads 45, 46 which are respectively provided on the plate 39 and partition 43 to insure that the plate 39 ceases to rotate as soon as the projections 37, 38 are caused to leave the sockets 35, 36.

A lever 47 which is fulcrumed in the housing 1, as at 48, has an arm provided with a rounded follower 47a bearing against the inner end face of the stub 40 under the action of a torsion spring 69. When the lever 47 is pivoted counterclockwise (from the angular position of FIG. 1 to that shown in FIG. 2) in response to depression of the button 10, the spring 69 stores energy and pivots a pawl 49 (which is also fulcrumed at 48) into engagement with a ratchet wheel 50 on the takeup reel 150 for motion picture film in the housing 1. Thus, the lever 47 effects an automatic stoppage of the takeup reel 150 at least against rotation in a direction to collect the film) in response to depression of the button 10. The latter will be depressed when the user of the camera wishes to start the making of exposures with fade-out effect and to thereupon expose the same portion of the film for the second time but with fade-in effect. The mounting of the lever 47 on the fulcrum means 48 is such that the lever can continue to pivot in a counterclockwise direction after the tooth of the pawl 49 engages the adjacent tooth of the ratchet wheel 50 on the takeup reel 150. When the button 10 is allowed to return to the extended (non-depressed) position of FIG. 1, the torsion spring 69 causes the follower 47a of the lever 47 to share the outward movement of the stub 40 and the lever engages a lug 49a of the pawl 49 to thereby disengage the latter from the ratchet wheel 50. The camera is then ready to make normal exposures or to expose a series of film frames with fade-out effect and to thereupon expose a next-following series of film frames with fade-in effect. The size of the aperture defined by the diaphragm D is then adjustable by the manually rotable control ring 2. The parts 47–50 constitute but one of several types of arresting means for holding the takeup reel 150 against rotation during the making of exposures with fade-out effect and, if necessary, during the rearward transport of those film frames which were exposed with fade-out effect. For example, the purely mechanical arresting means 47–50 can be replaced with suitable electro mechanical or electromagnetic arresting means.

The partition 43 of the housing 1 further supports a switch assembly 51 including a pair of resilient movable contacts 52 (see also FIGS. 6–9) provided with hemispherical tips 53 and extending into the path of axial movement of the control member or plate 39. When the button 10 is depressed to assume the position of FIG. 2, the tips 53 of the resilient contacts 52 engage the tips 54 of fixed contacts 55 of the assembly 51. At the same time, the contacts 52 engage the tips 59 of resilient movable contacts 57 also forming part of the assembly 51. When the plate 39 dwells in the axial position of FIG. 1, the movable contacts 52 engage the tips 58 of contacts 56 of the assembly 51.

FIG. 13 shows a release element 61 which is installed in the front wall 1a of the camera housing 1 below the lens mount 60 and can be depressed against the action of a spring 61a (FIGS. 6–8) to thereby move an entraining member 62 from the position shown in FIGS. 1 to 4 to that shown in FIG. 5. The purpose of the entraining member 62 is to move the gear 14 into motion-receiving engagement with the worm wheel 29 upon completion of exposures with fade-out effect. To this end, the tooth of the entraining member 62 engages the segment 19 when the latter dwells in the angular position shown in FIGS. 3–5.

The side wall 1b of the housing 1 is provided with an opening for a depressible motor reversing selector knob 63 (see FIGS. 6–8 and 13) which can close a normally open reversing switch 64 installed in the circuit of the camera motor 13. When the switch 64 is closed, the motor 13 can rotate the worm 68 in reverse so that the customary film feeding of transporting mechanism (which receives motion from the output shaft of the motor 13 or from the worm 68 and may include a conventional claw pull-down) can move the film rearwardly subsequent to completion of a series of exposures with fade-out effect and prior to renewed exposure (with fade-in effect) of those film frames which were exposed with fade-out effect. A spring 65 (FIGS. 6–8) tends to maintain the selector knob 63 in the extended position in which the reversing switch 64 is open.

The side wall 1b of the camera housing 1 is further provided with a window 66 which is adjacent to one end of a light-conducting member 67. The latter is mounted in the housing 1 in such a way that the user of the cameras can see the segment 19 by looking through the window 66 when the segment 19 assumes the angular position shown in FIGS. 3–5, namely, upon completion of a series of exposures with fade-out effect.

Referring to FIGS. 6–9 in detail, it will be seen that the switch assembly 51 comprises four discrete electric switches. The two resilient contacts 52 are secured to each other by a bridge 70 of insulating material so that they can be flexed as a unit when the plate 39 is caused to move to the position shown in FIG. 2. The contacts 52 form two discrete switches with the contacts 55 and the contacts 56 form two discrete switches with the contacts 57. The contacts 56 engage with the respective contacts 57 when the plate 39 dwells in an intermediate position which is shown in FIG. 3.

The release element 61 can close two normally open electric switches 71, 72 and it can open a normally closed electric switch 73. The switches 71, 72 must be closed when the motor 13 is to rotate in a forward direction; the switch 73 must be closed when the motor 13 is to rotate in reverse as soon as the user of the camera depresses the selector knob 63 to close the normally open reversing switch 64. The energy source (e.g., one or more batteries) for the motor 13 is shown at 74.

The electrical components of the camera circuit assume the positions shown in FIG. 6 when the user depresses the release element 61 and the button 10. The two switches 52, 55 are closed by the plate 39, the switches 71, 72 are closed by the release element 61, and the latter maintains the switch 73 in open position. The circuit of the motor 13 is completed in such a way that the motor rotates in a forward direction. FIG. 7 illustrates the components of the circuit in positions they assume when the motor 13 is operated in reverse. The release element 61 dwells in its idle or inoperative position so that the switch 73 is closed and the switches 71, 72 are open. The two switches 52, 55 are open because the plate 39 dwells in the position of FIG. 3 in which the two switches 56, 57 are closed. The user maintains the selector knob 63 in the depressed position (shown by solid lines) so that the reversing switch 64 is closed and completes the motor circuit.

The components of the camera circuit assume the positions shown in FIG. 8 when the motor 13 is idle.

Figure 10:
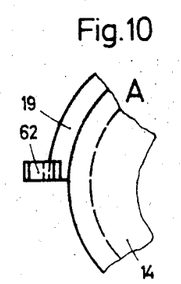
FIG. 10 is a fragmentary plan view of the first control member in a first angular position, substantially as seen in the direction of arrow A shown in FIG. 3.
Figure 11:
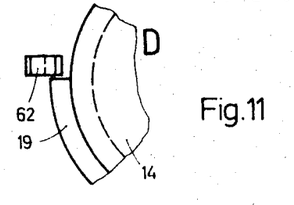
FIG. 11 is a similar fragmentary plan view of the first control member in a second angular position, substantially as seen in the direction of arrow D shown in FIGS. 1 and 2.

FIG. 10 illustrates the gear 14 in that angular position in which one end of its segment 19 registers with the entraining member 62. The segment 19 assumes such angular position upon completion of exposures with fade-out effect. In FIG. 11, the segment 19 is out of register with entraining member 62; the segment 19 assumes such position prior to the making of exposures with fade-out effect.

The placing of the motion transmitting member (worm wheel 29) of the drive means 13, 29, 68 between the control members 14 and 39 contributes to compactness of the fading mechanism. It will be noted that the number (n) of angular positions of the motion transmitting member or worm wheel 29 in which the latter can be coupled with the first control member or gear 14 is twice the number of angular positions in which the worm wheel 29 can be coupled with the control member or plate 39. The control ring 2 can be said to normally constitute a retaining or blocking device which prevents rotation of the gear 14 when the latter is disengaged from the worm wheel 29.

The operation:

The camera is normally provided with a selector (not shown) which can replace the knob 63 and can be moved between two positions in one of which the camera is set to expose a first series of film frames with fade-out effect and thereupon a different second series of film frames with fade-in effect. In the other position of the selector, the camera is set to expose a series of film frames with fade-out effect, to thereupon transport the film portion with once-exposed frames rearwardly, and to finally expose the same series of film frames for the second time but with fade-in effect. It is now assumed that the selector is maintained in its second position.

In the first step, the user of the camera depresses the release element 61 to its operative position in order to start the motor 13 in a forward direction for the making of normal exposures. The motor circuit is completed from the lower pole of the energy source 74 (as viewed in FIG. 8), by way of the switch 71, motor 13, switch 72 and to the upper pole of the energy source 74. When the making of normal exposures is to be followed by a series of exposures with fade-out effect, the user depresses the button 10 so that the displacing shaft 4 moves downwardly, as viewed in FIG. 1, and comes to a halt (it is arrested by the pin 9) in the position shown in FIG. 2. The washer 15 shares the axial movement of the shaft 4 and pushes the control member or gear 14 (which is in permanent mesh with the diaphragm-adjusting gear 23) so that the spring 28 stores energy and the friction pad 18 of the gear 14 engages the friction pad 18 on the worm wheel 29 which is rotated by the worm 68. Thus, the gear 14 begins to rotate with the worm wheel 29 while the control ring 2 remains at a standstill because the projections 21, 22 are expelled from the sockets 6, 7 in response to depression of the button 10.

Figure 2:
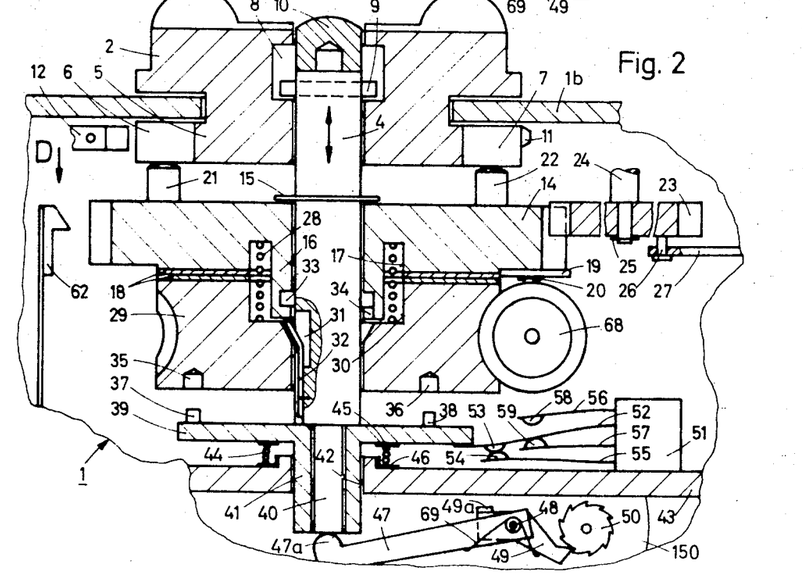
FIG. 2 illustrates the structure of FIG. 1 but with the first and second control members in positions they assume for the making of exposures with fade-out effect.
Figure 3:
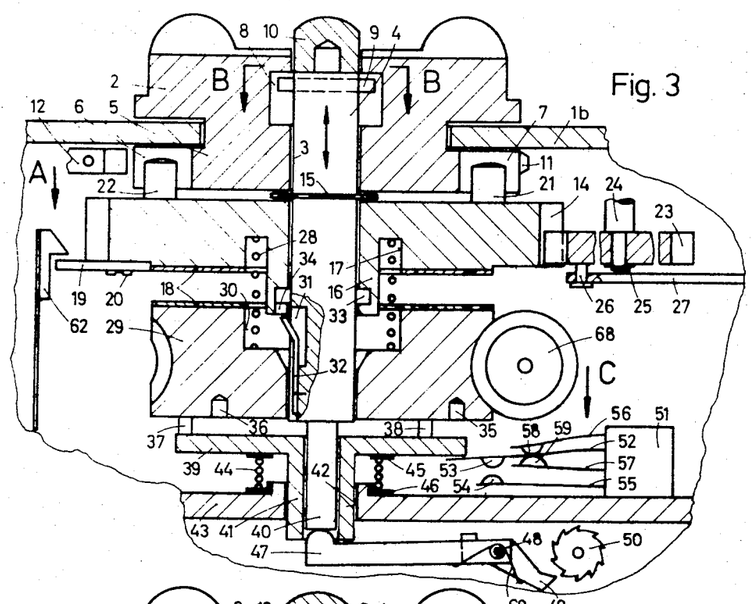
FIG. 3 illustrates the structure of FIG. 1 but with the first and second control members in positions they assume when the camera motor is ready for rearward transport of those film frames which were exposed with fade-out effect.

The shoulder 40a of the shaft 4 pushes the switch-actuating control member or plate 39 to the first disengaged position of FIG. 2 in response to depression of the button 10 so that the projections 37, 38 of the plate 39 are expelled from the sockets 35, 36 of the worm wheel 29. Therefore, the plate 39 ceases to rotate due to the provision of friction generating braking washers 45, 46 which are engaged by the respective end convolutions of the braking spring 44. As the plate 39 moves to the position of FIG. 2, it closes the two switches 52, 55 (see FIG. 6) so that the circuit of the motor 13 (for rotation in the forward direction) remains completed even if the spring 61a is allowed to return the release element 61 to its idle or inoperative position. This will be readily understood by referring to FIG. 6 which shows that, when the button 10 is depressed, the circuit of the motor 13 is completed from the lower pole of the energy source 74, by way of the upper switch 52, 55, motor 13, lower switch 52, 55 and to the upper pole of the energy source. It will be noted that the two switches 52, 55 are connected in parallel with the switches 71, 72 which are normally open but can be closed in response to depression of the release element 61.

As the friction pads 18 on the gear 14 and worm wheel 29 cause the gear 14 to rotate with the worm wheel, the projections 21, 22 begin to orbit about the axis of the displacing shaft 4 relative to the stationary control ring 2 so that the tips of these projections move out of register with the sockets 6, 7 whereby the gear 14 is held against return movement to the position of FIG. 1 even if the pressure upon the release element 61 is terminated. The circuit of the motor 13 remains completed by way of the two switches 52, 55 even if the release element 61 is allowed to reassume its idle position and to thus effect and opening of the switches 71, 72. The user need not exert pressure upon the button 10 because, as the projections 21, 22 slide along the inner end face 5a of the collar 5, the gear 14 remains in motion-receiving engagement with the worm wheel 29 and continues to rotate the gear 23 in a direction to cause the setting member 27 to gradually reduce the size of the light-admitting aperture which is defined by the diaphragm D so that the camera makes exposures with fade-out effect. The displacing shaft 4 cannot return to the axial position of FIG. 1 (i.e., the plate 39 is compelled to remain in the axial position of FIG. 2 in which it maintains the two switches 52, 55 in closed position) even if the button 10 is released because the pallet of the leaf spring 32 on the shaft 4 bears against the lower or inner end face of the hub 16 which forms part of the gear 14 and cannot follow the bias of the spring 28 because the projections 21, 22 are out of register with the sockets 6, 7 of the control ring 2.

When the worm wheel 29 completes one-half of a single revolution (such angular movement is shared by the gear 14), the projections 21, 22 respectively move into register with the sockets 7, 6 and the spring 28 is free to expand so as to immediately disengage the gear 14 from the worm wheel 29 (see FIG. 3). Such axial movement of the gear 14 takes place at the exact moment when the slot 34 of its hub 16 is aligned with the pallet of the spring 32 on the displacing shaft 4. The making of exposures with fade-out effect is completed; for example, the diaphragm D then prevents any light from reaching the film frame which is in registry with the light-admitting aperture.

FIG. 3 shows that the switch-actuating plate 39 cannot share the entire movement of the displacing shaft 4 from the position of FIG. 2 (the shaft 4 is moved upwardly by the washer 15 which is pushed by the gear 14 in response to expansion of the spring 28). This is due to the fact that the sockets 35, 36 in the worm wheel 29 are located at different distances from the axis of the displacing shaft 4, i.e., that the projections 37, 38 can reenter the respective sockets 35, 36 only after the worm wheel 29 completes a full revolution with reference to the plate 39. Therefore, as the displacing shaft 4 moves upwardly from the position of FIG. 2 to that shown in FIG. 3 (under the action of the spring 28 and washer 15), the braking spring 44 is free to expand to a certain extent so as to maintain the tips of the projections 37, 38 in abutment with the adjacent end face of the worm wheel 29. This is a second disengaged position of the plate 39 in which the two switches 52, 55 are open but the two switches 56, 57 are closed (see FIG. 7). The circuit of the motor 13 is completed in response to closing of the reversing switch 64) from the upper pole of the energy source 74 (as viewed in FIG. 7), by way of the upper switch 56, 57, switches 73, 64, motor 13, the lower switch 56, 57 and to the lower pole of the energy source 74. The worm 68 rotates the worm wheel 29 counter to the direction of preceding rotation of the worm wheel with the gear 14, so that the sockets 35, 36 respectively rotate back toward the projections 37, 38 which are at a standstill because the plate 39 is held against rotation by the braking washers 45, 46 and braking springs 44. The rotation of the motor 13 in reverse is terminated in automatic response to return of sockets 35, 36 into register with the projections 37, 38 because the braking spring 44 is then allowed to expand and to move the plate 39 from the second disengaged position of FIG. 3 into the upper end position or motion receiving position of FIG. 4 in which the two switches 56, 57 are open (see FIG. 8) so as to open the motor circuit regardless of the positions of the switches 73 and 64. The release element 61 is assumed to dwell in its iddle or inoperative position so that the switches 71, 72 are open and the switch 73 is closed. It will be seen that the rotation of the motor 13 in reverse is terminated at the exact moment when the film feeding mechanism (namely, the aforementioned claw pull-down of such film feeding mechanism) completes the rearward transport of all those film frames which were exposed with fade-out effect. Such film frames are then located upstream of the light-admitting aperture and can be exposed again in response to renewed completion of the motor circuit in a direction to cause the pull-down to transport the film forwardly.

The switches 64 and 73 perform the following function: In the absence of these switches, the motor 13 would be started in reverse in response to partial depression of the button 10 (when the plate 39 assumes the intermediate position of FIG. 3 during its movement from the position of FIG. 1 toward the position of FIG. 2). Were the switches 73 and 64 omitted, the motor 13 would then rotate in reverse because the plate 39 closes the two switches 56, 57 prior to closing of the two switches 52, 55. During the depression of button 10 to start the making of exposures with fade-out effect, the release element 61 is held in the depressed or operative position of FIG. 6 in which the switch 73 is open so that the motor 13 cannot rotate in reverse even though the switches 56, 57 are temporarily closed during movement of the plate 39 from the position of FIG. 1 to that shown in FIG. 2. The motor 13 can rotate in reverse only when the release element 61 is in the idle or inoperative position so that the switch 73 is closed. At the same time, the plate 39 must dwell in the intermediate position of FIG. 3 to close the two switches 56, 57, and the user must depress the selector knob 63 to close the reversing switch 64 which is in series with the switch 73 and with one of the switches 56, 57.

The arresting mechanism including the parts 47–50 is desirable in motion picture cameras for use with takeup reels 150 which cannot rotate in a direction to pay out the exposed motion picture film. In such cameras, the takeup reel 150 should not rotate (in a direction to collect the film) when the exposures are being made with fade-out effect because, since the takeup reel cannot rotate in reverse, it could not pay out those film frames which were exposed with fade-out effect. As explained above, the making of exposures with fade-out effect is started in response to depression of the button 10. This button causes the displacing shaft 4 (namely, the lower or inner end face of the stub 40) to pivot the lever 47 in a counterclockwise direction, as viewed in FIG. 1, so that the lever 47 stresses the torsion spring 69 which causes the tooth of the pawl 49 to engage the adjacent tooth of the ratchet wheel 50 and to thus terminate the rotation of takeup reel 150 in a direction to collect the film. Therefore, the film frames which are being exposed with fade-out effect form one or more loose loops which are accommodated in the interior of the camera housing 1 or in the interior of a film-containing cassette, not shown. If the takeup reel 150 is strong enough to resist the rotation in a direction to pay out the film without any assistance on the part of the arresting mechanism including the parts 47–50, the follower 47a of the lever 47 must engage the stub 40 only during the last stage of movement of the displacing shaft 4 to the lower or inner end position of FIG. 2. If the resistance of the reel 150 to unwinding of film in response to rearward transport of the once-exposed film frames (with fade-out effect) is relatively low, the tooth of the pawl 49 and the teeth of the ratchet wheel 50 are preferably designed in such a way that the pawl 49 holds the ratchet wheel 50 and the reel 150 against any rotation during the making of exposures with fade-out effect as well as during the next-following rearward transport of those film frames which were exposed with fade-out effect. In other words, the teeth on the pawl 49 and on the ratchet wheel 50 can be designed in such a way, and the mounting of the lever 47 may be such, that the pawl 49 cooperates with the ratchet wheel 50 to hold the reel 150 against any rotation in the end position of the plate 39 as shown in FIG. 2 (the making of exposures with fade-out effect) as well as in the intermediate position of the plate 39 as shown in FIG. 3 (the rearward transport of those film frames which are exposed with fade-out effect).

As the gear 14 rotates with the worm wheel 29 (exposures with fade-out effect) in response to depression of the button 10, the arcuate segment 19 shares the angular movement of the gear 14 and one of its ends moves into register with the claw or prong of the entraining member 62 (see FIGS. 3 and 10) when the projections 21, 22 of the gear 14 are respectively free to enter the sockets 7, 6. For the sake of simplicity, the entraining member 62 is shown with a single claw or prong; however, it is equally within the purview of the invention to employ an entraining member with two claws or prongs which are located substantially diametrically opposite each other with reference to the axis of the displacing shaft 4 to engage the segment 19 at two angularly spaced locations in response to depression of the release element 61 and provided that the segment 19 dwells in the angular position of FIG. 3 (in which the projections 21, 22 of the gear 14 respectively register with the sockets 7, 6 of the control ring 2). This reduces the likelihood of tilting of the gear 14 by the entraining member 62 during movement of the gear 14 toward the worm wheel 29 and the likelihood of unsatisfactory frictional engagement between the pads 18 on the parts 14 and 29.

In order to reexpose the previously exposed film frames with fade-in effect, the user must merely depress the release element 61 whereby the entraining member 62 engages the segment 19 (at one or more locations, depending on the number of prongs or claws on the entraining member 62) and moves the gear 14 into motion-receiving engagement with the worm wheel 29. The worm wheel 29 begins to rotate in response to depression of the release element 61 because the latter closes the switches 71, 72 and opens the switch 73 so that the circuit of the motor 13 is completed in the forward direction. The claw pull-down then transports the once-exposed film frames into registry with the light-admitting aperture of the diaphragm D while the gear 14 rotates the pin 26 on the gear 23 in a direction from the position of FIG. 5 back to the position of FIG. 1 whereby the setting member 27 gradually increases the size of the light-admitting aperture defined by the diaphragm D so that the camera makes exposures with fade-in effect. When the gear 14 is being shifted from the position of FIG. 4 to the position of FIG. 5 by way of the segment 19 and entraining member 62 (i.e., in response to depression of the release element 61 upon completion of rearward transport of the film frames which were exposed with fade-out effect), the pallet of the leaf spring 32 on the displacing shaft 4 registers with the slot 34 of the hub 16 so that such pallet can enter the internal groove 33 in the hub 16. This insures that the hub 16 cannot depress the shaft 4 against the opposition of the spring 28 so that the parts 4 and 39 remain in the axial positions shown in FIG. 1. The spring 28 is free to expand and to return the gear 14 to the position of FIG. 1 in response to rotation of the gear 14 through exactly 180° because the projections 21, 22 then respectively return into register with the sockets 6, 7 of the control ring 2. The pallet of the spring 32 is depressed radially inwardly into the axial groove 31 of the displacing shaft 4 when the spring 28 expands whereby the pallet reassumes its operative position as soon as the gear 14 returns to the position of FIG. 1 to terminate the making of exposures with fade-in effect (because its pad 18 is disengaged from the pad 18 of the worm wheel 29 and the gear 23 ceases to rotate when it returns to the angular position of FIG. 1 in which the setting member 27 causes the diaphragm D to define an aperture of maximum size). The pallet of the spring 32 thereupon registers with the unslotted portion of the inner end face of the hub 16 so that the spring 32 insures that the plate 39 cannot leave the first disengaged position of FIG. 2 upon renewed depression and subsequent release of the button 10 until and unless the making of a predetermined number of exposures is completed in a manner as described above. Thus, the spring 32 prevents the plate 39 from leaving the first disengaged position upon depression and subsequent release of the button 10 until and unless the gear 14 reassumes its disengaged position. However, the return movement of plate 39 to the position of FIG. 1 must be preceded by a movement to and a dwell in the second disengaged position of FIG. 3 (this is caused by the projections 37, 38).

The camera begins to make normal exposures immediately after completion of the last exposure with fade-in effect as long as the user continues to maintain the release element 61 in depressed or operative position.

If the making of exposures with fade-out effect is not immediately followed by the making of exposures with fade-in effect, the user of the camera is likely to forget that the last exposure were made with fade-out effect and that the first exposures of the next series will be made with fade-in effect. The purpose of the aforementioned window 66 in the side wall 1b of the camera housing 1 and of the light-conducting member 67 (one end of which is aligned with the window 66 and the other end of which is aligned with a portion of the segment 19 when the latter dwells in the angular position shown in FIGS. 3-5 and 10) is to enable the user to determine at a glance the condition of the fading mechanism prior to the making of a series of exposures after a relatively short or long interruption. The parts 19, 66, 67 constitute but one of several suitable indicating or memory refreshing devices which can be utilized in the camera of the present invention to indicate to the user whether or not the diaphragm D defines an aperture of maximum, minimum or other size. For example, the camera housing 1 can accommodate a light source which directs a beam of light into the window 66 or directly into the viewfinder (not shown), and such light beam can be interrupted by the segment 19, a portion of or a member provided on the gear 23, or a portion of or a member movable with the setting means 27 when the aperture size of the diaphragm D is reduced from the maximum size (completion of exposures with fade-in effect and the making of normal exposures) by one f/stop but preferably by at least 2 f/stops. Alternatively, the segment 19, the gear 23 or the setting means 27 can control a switch (not shown) which completes the circuit of a light source (not shown) when the aperture size defined by the diaphragm D is reduced by 1 or more f/stops whereby the light source furnishes a light beam which can be seen in the window 66 or in the viewfinder. This enables the user to determine at a glance the condition of the fading means so as to avoid improper manipulation of the camera after an interval of non-use which is long enough to be conducive to an improper manipulation of the camera. Thus, by looking at the position of the aforementioned selector, the user of the camera can determine whether or not the camera is set for such operation that a series of film frames must be exposed with fade-out effect prior to renewed exposure of such frames but with fade-in effect. On the other hand, by looking at the window 66 or into the view-finder, the user can determine whether or not the operation of the camera was interrupted after the making of exposures with fade-out effect. Since the rearward transport of film frames which were exposed with fade-out effect preferably follows the making of such exposures without any delay (and preferably automatically so that the camera comes to a standstill only when the rearward transport of such film frames is completed), a glance at the window 66 or at the viewfinder (in the above-discussed position of the selector) suffices to inform the user that the first exposures of the next series will be made with fade-in effect and that the film frames which will be exposed with fade-in effect were exposed once before but with fade-out effect. It was found that the provision of indicating means which can furnish signals intended to be seen in the viewfinder and to be indicative of the angular position of the segment 19 (i.e., of the condition of the diaphragm D) is particularly desirable because the user of the camera is apprised of the termination of making of exposures with fade-out effect, of the termination of rewinding and of the termination of the making of exposures with fade-in effect without being compelled to interrupt the observation of the subject or scene through the viewfinder.

The selector knob 63 constitutes an optional feature of the improved motion picture camera and is normally provided as a substitute for the aforementioned selector. In the absence of the knob 63, the reversing switch 64 can be or is designed in such a way that its movable contact can dwell in the open or closed position. This switch then constitutes the aforementioned selector which can replace the knob 63. The just described selector switch will be closed if the user of the camera decides in advance to make overlapping exposures with fade-out and fade-in effect so that the frames which were exposed with fade-out effect are transported rearwardly in automatic response to completion of exposures with fade-out effect. On the other hand, the knob 63 must be depressed at the time when the making of exposures with fade-out effect is completed and the release element 61 must dwell in its idle position (FIG. 7) if the making of such exposures is to be followed automatically by a rearward transport of a corresponding number of film frames so that such film frames can be reexposed but with fade-in effect. The provision of the selector switch or selector knob 63 enables the user to make a decision whether or not to reexpose the film frames which were exposed with fade-out effect shortly before the gear 23 assumes the angular position of FIG. 3. If the selector switch is closed or if the knob 63 is depressed prior to completion of exposures with fade-out effect while the release element 61 dwells in its idle position, the motor 13 is started in reverse in automatic response to movement of the gear 14 from the axial position of FIG. 2 to that shown in FIG. 3 because the parts of the camera circuit then assume the positions shown in FIG. 7 (i.e., the plate 39 dwells in its intermediate position and maintains the two switches 56, 57 in closed positions so that the circuit of the motor 13 is completed in reverse by way of the two switches 56, 57 and the switches 73, 64).

Figure 4:
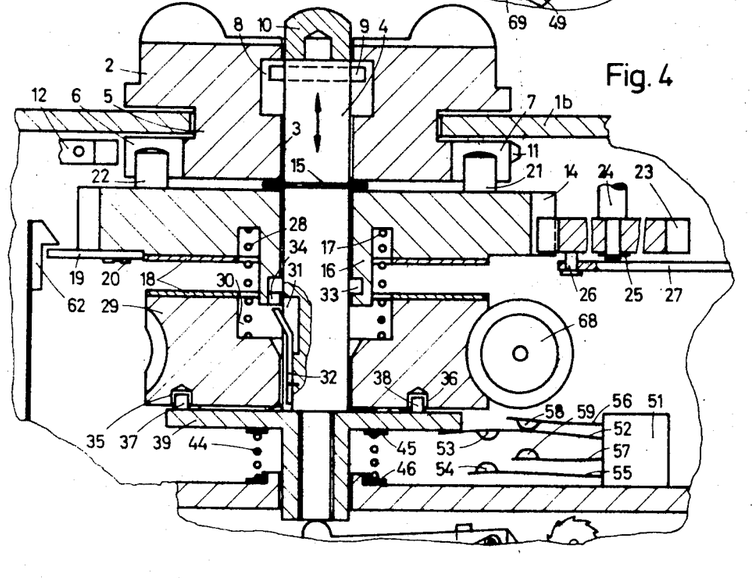
FIG. 4 illustrates the structure of FIG. 4 with the first and second control members in positions they assume subsequent to completed rearward transport of the film portion which was exposed with fade-out effect and prior to the making of exposures with fade-in effect.
Figure 5:
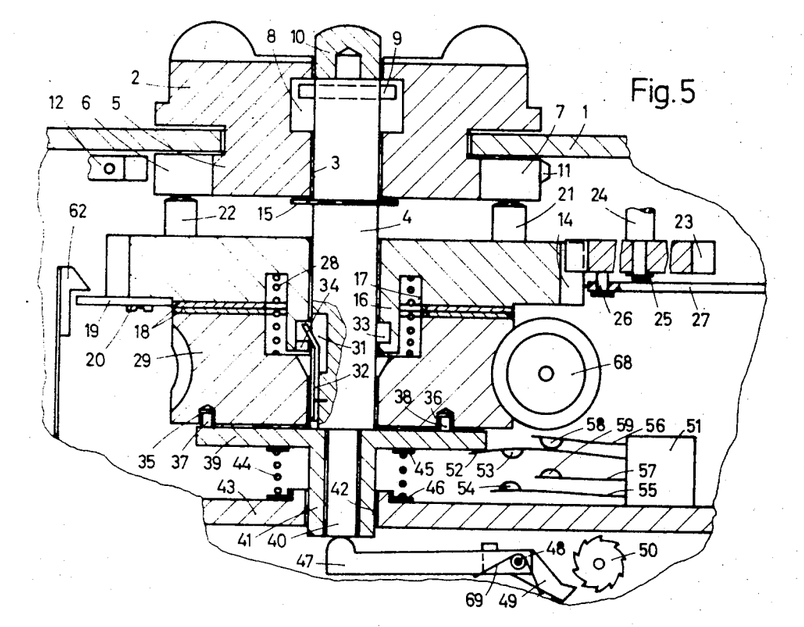
FIG. 5 illustrates the structure of FIG. 4 but with the first control member in a position it assumes for the making of exposures with fade-in effect.

The rearward transport of film frames which were exposed with fade-out effect is completed in a fully automatic way when the gear 14 reaches the angular position of FIG. 4 because the braking spring 44 is then free to expand and the plate 39 is allowed to open the two switches 56, 57 (see FIG. 8). The motor circuit is then open because the two switches 52, 55, the two switches 56, 57 and the switches 71, 72 are open regardless of the position of the switch 64. In order to reexpose the previously exposed film frames but with fade-in effect, the user merely depresses the release element 61 to close the switches 71, 72 and to thus complete the motor circuit for operation in the forward direction.

If the camera is provided with the aforementioned selector switch and the user does not wish to reexpose with fade-in effect those film frames which were already exposed with fade-out effect, the selector switch is moved to its open position. The making of exposures with fade-in effect, is again started in response to depression of the button 10 (in depressed position of the release element 61). In the open position of the selector switch, the circuit for operation of the motor 13 in reverse remains open during and upon completion of the making of exposures with fade-out effect. Therefore, the motor 13 is arrested in automatic response to completion of exposures with fade-out effect because the switches 71, 72 and 74 are assumed to be open and the two switches 52, 55 are open when the plate 39 dwells in the intermediate position of FIG. 3. If the user thereupon depresses the release element 61, the camera will make a series of exposures with fade-in effect and the next exposures will be made in the normal way (without any fading). However, should the user change his or her mind shortly before the making of exposures with fade-out effect (in the open position of the selector switch) is completed, the selector switch is simply closed and the motor 13 with automatically start and complete the rearward transport of those film frames which were exposed with fade-out effect. Thus, the versatility of the improved camera is such that the user can select the desired nature of fading operation prior to starting the making of exposures with fade-out effect or during the making of such exposures. The situation is the same if the selector switch is replaced by the knob 63, i.e., the user can decide to make a set of exposures first with fade-out effect and thereupon with fade-in effect either before the making of exposures with fade-out effect is started (by depressing the knob 63 simultaneously with the button 10 and by thereupon maintaining the knob 63 in depressed position until after the motor 13 comes to a full stop upon completed rearward transport of film frames which were exposed with fade-out effect) or during the making of exposures with fade-out effect provided that the knob 63 is depressed and maintained in depressed position prior to the making of the last exposure with fade-out effect. If the making of a series of exposures with fade-out effect is to be followed by the exposure of a different series of film frames with fade-in effect, the knob 63 is simply left untouched so that the motor 13 is arrested immediately after the last exposure with fade-out effect, i.e., without any rearward transport of those film frames which were exposed with fade-out effect.

It will be seen that the aforediscussed selector switch is merely a modified version of the switch 64, and such selector switch will be employed if the designer of the camera wishes to further simplify the operation during the making of exposures with fade-out and/or fade-in effect.

The improved camera can be further utilized for the making of exposures with special effects other than fading. For example, the size of the aperture which is furnished by the diaphragm D can be reduced by one or more f/stops for the making of normal exposures without any fade-in or fade-out effect. To this end, the user of the camera simply rotates the control member 2 in undepressed position of the button 10 so that the collar 5 of the control member 2 rotates the gear 23 by way of the studs 21, 22 and gear 14 whereby the setting member 27 reduces the aperture size to the desired extent. The control member 2 may be provided with a suitable index or marker (not shown) and the outer side of the wall 1b can be provided with a scale or dial (not shown) to facilitate the adjustment of the diaphragm D by a desired number of f/stops. The operative connection between the diaphragm D and the setting member 27 preferably includes a suitable compensating device (e.g., a spring) which enables the gear 14 to turn through 180° in response to movement to the axial position of FIG. 2 (depression of the button 10) even if such movement is started at a time when the control member 2 has caused the gear 14 to leave the angular position of FIG. 1 in order to reduce the aperture size prior to the making of the first exposure with fade-out effect. The compensating device insures that the parts of the camera are not damaged or destroyed if the fading operation is to begin in other but the fully open position of the diaphragm D. Upon completion of exposures with fade-in effect, the gear 14 returns to the angular position which was previously selected by the control member 2, i.e., not necessarily to the angular position shown in FIG. 1. Consequently, the next exposures (upon completion of the exposures with fade-in effect) will be made while the diaphragm D furnishes an aperture size whose size is less than the maximum possible size. However, if the user wishes, the control member 2 can be returned by hand to its normal position (shown in FIG. 1) upon completion of exposures with fade-out effect but prior to the making of exposures with fade-in effect; this will insure that the diaphragm D furnishes an aperture of maximum size as soon as the last exposure with fade-in effect is completed even if the making of exposures with fade-out effect was started while the control member 2 was held in a position in which the aperture size furnished by the diaphragm D was reduced by 1 or more f/stops. The friction between the wall 1b and the control ring 2 suffices to prevent uncontrolled angular movements of the control ring; however, it is clear that the camera may be provided with suitable detent means for yieldably holding the control ring 2 in a selected angular position.

The exact manner in which the gear 23 can effect appropriate adjustments in the size of the aperture furnished by the diaphragm D is disclosed, for example, in U.S. Pat. Nos. 2,672,073 and 3,043,185. As mentioned above, the aforementioned compensating device may comprise a simple spring but it is equally possible to employ a compensating device in the form of a friction clutch. A compensating spring is shown at 98 in the aforementioned U.S. Pat. No. 2,672,073.

The provision of the control member 2 further enables the user of the camera to make exposures with fade-out effect without subsequent fade-in. Thus, the user can depress the release element 61 to start the motor 13 in the forward direction and the control member 2 is thereupon rotated by hand at an appropriate speed so that the camera makes a desired number of exposures with fade-out effect. The aforementioned switch 12 at the inner side of the wall 1b (not shown in FIGS. 6–9) is installed in the circuit of the motor 13 in series with one of the switches 52, 55 or in series with one of the switches 71, 72 so that it must be closed when the motor 13 is to cause the claw pull-down to transport the film in a forward direction. When the rotation of the control member 2 through 180° is completed, i.e., when the making of exposures with fade-out effect in response to manual rotation of the gear 14 is terminated, the trip 11 on the collar 5 of the control member 2 opens the switch 12 so that the motor 13 is arrested. The user then terminates the finger pressure upon the release element 61 and rotates the control member 2 back to the angular position of FIG. 1 to thereby increase the size of the aperture furnished by the diaphragm D to its maximum value and to close the switch 12. A cap (not shown) can be placed on the lens mount 60 during rotation of the control member 2 back to the starting position of FIG. 1 but this is not necessary because, as a rule, the shutter (not shown) of the camera prevents entry of scene light when the motor 13 is idle.

The just described operation is reversed if the user wishes to make only exposures with fade-in effect. The control member 2 is rotated from the starting position of FIG. 1 through full 180° to close the diaphragm while the motor 13 is idle, i.e., while the shutter prevents the admission of scene light. The user thereupon depresses the release element 61 to start the motor 13 in a forward direction, and the user also rotates the control member 2 back to the starting position of FIG. 1 to gradually increase the size of the aperture which is being furnished by the diaphragm D. It is not even necessary to start the rotation of the control member 2 back toward the starting position of FIG. 1 simultaneously with depression of the release element 61 because the switch 12 is allowed to close only when the control member 2 is caused to leave that angular position in which it is displaced through 180° with reference to the position shown in FIG. 1, i.e., the trip 11 must be moved away from engagement with the switch 12.

Without further analysis, the foregoing will so fully reveal the gist of the present invention that others can, by applying current knowledge, readily adapt if for various applications without omitting features which fairly constitute essential characteristics of the generic and specific aspects of my contribution to the art and, therefore, such adaptations should and are intended to comprehended within the meaning and range of equivalence of the claims.

What is claimed as new and desired to be protected by Letters Patent is set forth in the appended claims:

1. In a motion picture camera, a combination comprising diaphragm means adjustable to provide a light-admitting aperture whose size decreases during the making of first exposures with fade-out effect and increases during the making of second exposures with fade-in effect; adjusting means operable to adjust said diaphragm; drive means for transporting motion picture film past said aperture forwardly and rearwardly; control means for establishing and terminating an operative connection between said drive means and said adjusting means for the making of said first and second exposures and for initiating a rearward transport of the film portion which was exposed to scene light during the making of said first exposures prior to the making of said second exposures, said control means including a first control member arranged to receive motion from said drive means during the making of said first and second exposures and a second control member arranged to receive motion from said drive means during the making of said second exposures and during the making of exposures without fade-out or fade-in effect; displacing means actuatable to respectively move said first and second control members into and from motion receiving engagement with said drive means and to thereby initiate the making of said first exposures followed by the rearward transport of said film portion; camera release means movable between idle and operative positions; and entraining means for moving said first control member into renewed engagement with said drive means so as to start the making of said second exposures on said film portion in response to movement of said release means to said operative position upon completed rearward transport of said film portion.

2. A combination as defined in claim 1, further comprising means for separably coupling said first and second control members to each other.

3. A combination as defined in claim 1, wherein said drive means comprises film transporting first motor means and second motor means for operating said adjusting means in the motion-receiving position of said first control member.

4. A combination as defined in claim 1, wherein said drive means comprises a common motion transmitting member for said first and second control members.

5. A combination as defined in claim 1, wherein said control means further comprises a third control member, said first and third control members being provided with cooperating male and female coupling means for connecting said first control member to said third control member in n different positions of said first control member when the latter is disengaged from said drive means, n being a whole number exceeding one.

6. A combination as defined in claim 5, wherein said control means further comprises means for biasing said first control member away from motion receiving engagement with said drive means.

7. A combination as defined in claim 5, wherein said coupling means comprises at least one projection on one of said first and third control members and at least one socket for said projection on the other of said first and third control members, said projection being arranged to maintain said first control member in motion receiving engagement with said drive means when it is out of register with said socket, said socket being adjacent to a portion of the path of movement of said first control member when the latter receives motion from said drive means.

8. A combination as defined in claim 5, wherein said drive means comprises a motion transmitting member for said second control member; said motion transmitting and second control members having cooperating male and female coupling means for connecting said second control members to said motion transmitting member in n/2 positions of said motion transmitting member with reference to said second control member.

9. A combination as defined in claim 8, further comprising means for biasing said second control member toward motion receiving engagement with said motion transmitting member and braking means for arresting said second control member in response to disengagement from said motion transmitting member.

10. A combination as defined in claim 9, wherein said biasing means forms part of said braking means.

11. A combination as defined in claim 1, further comprising common displacing means for said first and second control members and handgrip means for actuating said displacing means to thereby respectively move said first and second control members into and from motion, receiving engagement with said drive means for the starting of said first exposures.

12. A combination as defined in claim 1, further comprising a rotary takeup device for collecting the motion picture film during the making of exposures without fade-out or fade-in effect and during the making of exposures with fade-in effect, and arresting means for holding said takeup device at least against rotation in a direction to collect the film in response to movement of said first control member into motion receiving engagement with said drive means for the making of said first exposures.

13. A combination as defined in claim 12, further comprising displacing means actuatable to respectively move said first and second control members into and from motion receiving engagement with said drive means and to thereby initiate the making of said first exposures followed by the rearward transport of said film portion, said arresting means comprising follower means receiving motion from said displacing means.

14. A combination as defined in claim 1, wherein said first control member is in permanent motion transmitting engagement with said adjusting means.

15. A combination as defined in claim 1, further comprising a housing for said adjusting means and said diaphragm means and said drive means, said control means further comprising a third control member which is accessible from without said housing and is movable between a plurality of positions to thereby operate said adjusting means by way of one of said first and second control members when said one control member out of motion receiving engagement with said drive means.

16. A combination as defined in claim 15, wherein said first control member is in permenent motion transmitting engagement with said adjusting means and said adjusting means comprises compensating means for permitting movement of said first control member beyond the positions corresponding to those adjustments of said diaphragm means in which the latter defines apertures of maximum and minimum size.

17. A combination as defined in claim 15, wherein said third control member is movable by hand to and from a starting position corresponding to such adjustment of said diaphragm means in which the latter defines an aperture of maximum size, and drive means comprising electric motor means and further comprising normally open electric switch means in circuit with said motor means, said third control member comprising actuating means for closing said switch means in said starting position thereof, said actuating means being arranged to effect an opening of said switch means in response to such movement of said third control member which is necessary for the making of exposures with fade-out effect.

18. A combination as defined in claim 1, wherein said drive means comprises reversible electric motor means and further comprising camera release means movable between idle and operative positions and normally closed switch means connected in circuit with said motor means, said circuit comprising a first portion which is completed when said motor means rotates forwardly and a second portion which is completed when said motor means rotates rearwardly, said switch means being connected in the second portion of said circuit and being opened in response to movement of said release means to said operative position.

19. A combination as defined in claim 18, further comprising normally open second switch means connected in said second portion of said circuit and selector means actuatable to close said second switch means.

20. A combination as defined in claim 18, further comprising selector switch means movable between open and closed positions and connected in said second portion of said circuit.

21. A combination as defined in claim 1, wherein said first control member is movable by said drive means from a first to a second position during the making of said first exposures and further comprising indicating means for indicating at least one of said positions of said first control member.

22. A combination as defined in claim 21, wherein said indicating means comprises a window which permits observation of a portion of said first control member in said one position thereof.

23. A combination as defined in claim 22, further comprising elongated light conducting means having a first end adjacent to said window and a second end, said portion of said first control member being adjacent to said second end in said one position of said first control member.

24. A combination as defined in claim 21, further comprising view finder means, said indicating means comprising switch means which is arranged to close in response to movement of said first control member to said one position thereof and means for furnishing to said viewfinder visible signals in response to closing of said switch means.

25. In a motion picture camera, a combination comprising diaphragm means adjustable to provide a light-admitting aperture whose size decreases during the making of first exposures with fade-out effect and increases during the making of second exposures with fade-in effect; adjusting means operable to adjust said diaphragm; drive means for transporting motion picture film past said aperture forwardly and rearwardly; and control means for establishing and terminating an operative connection between said drive means and said adjusting means for the making of said first and second exposures and for initiating a rearward transport of the film portion which was exposed to scene light during the making of said first exposures prior to the making of said second exposures, said control means including a first control member arranged to receive motion from said drive means during the making of said first and second exposures and a second control member arranged to receive motion from said drive means during the making of said second exposures and during the making of exposures without fade-out or fade-in effect, said drive means comprising a common motion transmitting member for said first and second control members, said common motion transmitting member being disposed between said first and second control members.

26. In a motion picture camera, a combination comprising diaphragm means adjustable to provide a light-admitting aperture whose size decreases during the making of first exposures with fade-out effect and increases during the making of second exposures with fade-in effect; adjusting means operable to adjust said diaphragm; drive means for transporting motion picture film past said aperture forwardly and rearwardly; control means for establishing and terminating an operative connection between said drive means and said adjusting means for the making of said first and second exposures and for initiating a rearward transport of the film portion which was exposed to scene light during the making of said first exposures prior to the making of said second exposures, said control means including a first control member arranged to receive motion from said drive means during the making of said first and second exposures and a second control member arranged to receive motion from said drive means during the making of said second exposures and during the making of exposures without fade-out or fade-in effect; displacing means actuatable to respectively move said first and second control members into and from motion receiving engagement with said drive means to thereby initiate the making of said first exposures whereby said second control member assumes and dwells in a first disengaged position while said first control member remains in motion receiving engagement with said drive means during the making of said first exposures; and biasing means arranged to move said second control member to a second disengaged position in which said second control member initiates the rearward transport of said film portion in response to disengagement of said first control member from said drive means upon completion of said first exposures.

27. A combination as defined in claim 26, wherein said drive means comprises a motion transmitting member and said motion transmitting member and said second control member comprise cooperating male and female coupling means which connect said second control member to said motion transmitting member when the latter drives said second control member and which maintain said second control member in said second disengaged position against the opposition of said biasing means during the rearward transport of said film portion, said second control member being arranged to arrest said drive means in response to reengagement of said male and female coupling means upon completed rearward transport of said film portion.

28. A combination as defined in claim 26, wherein said drive means comprises reversible electric motor means and switch means connected in circuit with said motor means and being actuated by said second control member in said second disengaged position thereof to thereby complete said circuit for operation of said motor means in reverse in response to disengagement of said first coupling member from said drive means upon completion of said first exposures.

29. A combination as defined in claim 26, further comprising means for preventing the movement of said second control member from said first to said second disengaged position while said first control member receives motion from said drive means during the making of said first exposures.

30. In a motion picture camera, a combination comprising diaphragm means adjustable to provide a light-admitting aperture whose size decreases during the making of first exposures with fade-out effect and increases during the making of second exposures with fade-in effect; adjusting means operable to adjust said diaphragm; drive means for transporting motion picture film past said aperture forwardly and rearwardly, said drive means comprising electric motor means; control means for establishing and terminating an operative connection between said drive means and said adjusting means for the making of said first and second exposures and for initiating a rearward transport of the film portion which was exposed to scene light during the making of said first exposures prior to the making of said second exposures, said control means including a first control member arranged to receive motion from said drive means during the making of said first and second exposures and a second control member arranged to receive motion from said drive means during the making of said second exposures and during the making of exposures without fade-out or fade-in effect; camera release means movable between idle and operative positions; normally open first switch means connected in circuit with said motor means and being closed in response to movement of said release means to said operative position; and normally open second switch means connected in parallel with said first switch means and being closed by said second control member in response to movement of said first control member into motion receiving engagement with said drive means for the making of said first exposures.

31. In a motion picture camera, a combination comprising diaphragm means adjustable to provide a light-admitting aperture whose size decreases during the making of first exposures with fade-out effect and increases during the making of second exposures with fade-in effect; adjusting means operable to adjust said diaphragm; drive means for transporting motion picture film past said aperture forwardly and rearwardly; control means for establishing and terminating an operative connection between said drive means and said adjusting means for the making of said first and second exposures and for initiating a rearward transport of the film portion which was exposed to scene light during the making of said first exposures prior to the making of said second exposures, said control means including a first control member arranged to receive motion from said drive means during the making of said first and second exposures and a second control member arranged to receive motion from said drive means during the making of said second exposures and during the making of exposures without fade-out or fade-in effect, said first control member being rotatable by said drive means between first and second angular positions which said first control member respectively assumes prior to and upon completed making of said first exposures; camera release means movable between idle and operative positions; and entraining means arranged to share the movements of said release means, said first control member comprising a portion which is located in the path of movement of said entraining means in the second angular position of said first control member and in the idle position of said release means, said entraining means being arranged to move said first control member into motion receiving engagement with said drive means in response to movement of said release means to said operative position and while said first control member dwells in said second angular position to thereby initiate the making of said second exposures.

32. A combination as defined in claim 31, wherein said portion of said first control member is of arcuate shape and said entraining means comprises at least one prong which engages said arcuate portion in response to movement of said release means to said operative position subsequent to movement of said first control member to said second angular position.

33. In a motion picture camera, a combination comprising diaphragm means adjustable to provide a light-admitting aperture whose size decreases during the making of first exposures with fade-out effect and increases during the making of second exposures with fade-in effect; adjusting means operable to adjust said diaphragm; drive means for transporting motion picture film past said aperture forwardly and rearwardly; and control means for establishing and terminating an operative connection between said drive means and said adjusting means for the making of said first and second exposures and for initiating a rearward transport of the film portion which was exposed to scene light during the making of said first exposures prior to the making of said second exposures, said control means including a first control member arranged to receive motion from said drive means during the making of said first and second exposures and a second control member arranged to receive motion from said drive means during the making of said second exposures and during the making of exposures without fade-out or fade-in effect, said first and second control members being rotatable by said drive means about a common axis and being further movable axially into and from motion receiving engagement with said drive means.

34. A combination as defined in claim 33, wherein said first control member includes a first gear and said adjusting means comprises a second gear meshing with said first gear, said second control member comprising a switch-actuating portion and said drive means comprising electric motor means, and further comprising switch means connected in circuit with said motor means and actuatable by said portion of said second control member.

35. A combination as defined in claim 34, wherein said drive means further comprises a rotary motion transmitting member located between said first and second control members, said motion transmitting member being held against axial movement and being in motion transmitting engagement with said first and second control members during the making of said second exposures, said second control member being disengaged from said motion transmitting member during the making of said first exposures and both said control members being disengaged from said motion transmitting member during the rearward transport of said film portion.

36. A combination as defined in claim 38, wherein said motion transmitting member of said drive means is coaxial with said first and second control members.

37. A combination as defined in claim 36, further comprising axially movable displacing means for said control members, said displacing means defining a common pivot axis mitting member, and a housing for said diaphragm means, said adusting means and said drive means, said displacing means comprising a handgrip portion which is accessible without said housing.

38. A combination as defined in claim 37, further comprising a third control member coaxial with said first control member and being accessible without said housing, said third control member being rotatable by hand to thereby operate said adjusting means by wayof said first control member when the latter is disengaged from said motion transmitting member.

39. In a motion picture camera, a combination comprising diaphragm means adjustable to provide a light-admitting aperture whose size decreases during the making of first exposures with fade-out effect and increase during the making of second exposures with fade-in effect; adjusting means operable to adjust said diaphragm; drive means for transporting motion picture film past said aperture forwardly and rearwardly; and control means for establishing and terminating an operative connection between said drive means and said adjusting means for the making of said first and second exposures and for initiating a rearward transport of the film portion which was exposed to scene light during the making of said first exposures prior to the making of said second exposures, said control means including a first control member arranged to receive motion from said drive means during the making of said first and second exposures and a second control member arranged to receive motion from said drive means during the making of said second exposures and during the making of exposures without fade-out or fade-in effect, said first control member comprising a first toothed gear which is rotatable by and movable axially relative to said drive means and said adjusting means comprising a second toothed gear meshing with said first gear, the axial length of one of said gears being such that said first gear remains in mesh with said second gear in each axial position thereof.

40. A combination as defined in claim 39 wherein said first gear comprises an arcuate portion extending beyond the teeth thereof and further comprising camera release means movable between idle and operative position, said first gear being movable by said drive means from a first to a second angular position during the making of said first exposures and said release means comprising entraining means arranged to engage said arcuate portion and to move said first gear into motion receiving engagement with said drive means in response to movement of said release means to said operative position while said first gear assumes said second angular position.

* * * * *